C. S. NORTON.
CASH FARE TICKET.
APPLICATION FILED APR. 26, 1913.
1,086,688.
Patented Feb. 10, 1914.
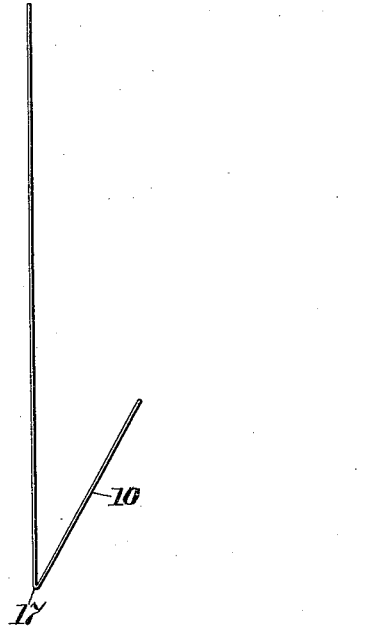
WITNESSES
INVENTOR
Clifford S. Norton
Attorney

UNITED STATES PATENT OFFICE.

CLIFFORD S. NORTON, OF PLEASANTVILLE, NEW YORK.

CASH-FARE TICKET.

1,086,688.  Specification of Letters Patent.  Patented Feb. 10, 1914.

Application filed April 26, 1913. Serial No. 763,865.

*To all whom it may concern:*

Be it known that I, CLIFFORD S. NORTON, a citizen of the United States, residing at Pleasantville, in the county of Westchester and State of New York, have invented a certain new and useful Improvement in Cash-Fare Tickets, of which the following is a full, clear, and exact description.

Various devices, such as duplex tickets, the two parts of which are intended to be simultaneously punched, for any given indication, are employed by railroad companies as checks upon the conductors in the collection of cash fares on trains, but all such devices, so far as I am aware, are capable of being so manipulated as to thwart their purpose either by carelessness on the part of the passengers or irregularities on the part of the conductors. Many of these devices are of such a character as to render the work of the accounting officers difficult.

It is customary for railroad companies to add ten cents to the regular fare on these cash fare transactions, and the passenger is given a coupon, which may be redeemed, for this extra charge, but many passengers are careless about these coupons, not only as to their receipt, but as to their preservation and presentation for redemption.

The object of the present invention is to provide a coupon cash fare ticket in which the amount of the fare paid is so conspicuously displayed as to compel the passenger's attention, and the punching of the coupon for the passenger and that part of the ticket which is to be retained by the conductor is so necessarily coincident that the punching of one necessarily involves the like punching of the other, and the fare indication is so conspicuously and so permanently and unalterably placed upon the conductor's part as to make falsification well-nigh impossible.

The invention consists in a cash fare ticket of the character described, wherein the names of the stations on the road on which the tickets are to be used are printed conspicuously, and the fare between stations indicated by a primary figure on one ticket of a series, expressing the minimum fare between stations, and other numerals expressing fractions between the primary figure of that ticket and the next higher primary figure, these figures and numerals being conspicuously displayed; and these designations of fractions are so arranged upon the passenger's coupon and the stub or conductor's portion of the ticket, that when the passenger's coupon is folded back upon the conductor's portion and punched, the punch hole appears alike on both parts of the ticket. And the same scheme is followed with respect to any other item on the ticket which serves to indicate its value or character, as for instance, whether it is a full fare or a half fare. The tickets are provided in series, made up of multiples of the minimum primary figure and consecutive fraction numerals, as I will proceed now to explain and finally claim.

In the accompanying drawings, illustrating the invention, in the several figures of which like parts are similarly designated, Figure 1 is a plan view of the extended face side of a ticket calling for a fare ranging from five to nine cents. Fig. 2 is a plan view, and Fig. 3 an edge view showing such a ticket folded, it being understood, of course, that the two parts of the ticket will be folded flat against one another when subjected to the punch, instead of standing off as indicated in Fig. 3.

The spaces 1 and 2 in the conductor's portion of the ticket will have printed in them the names of the stations on the railroad on which the ticket is to be used. The spaces 3 and 4 will receive any desired items. The space 5 will receive the name of the road and any directions to be authenticated by the railroad officials, showing the value of the ticket, its disposition, etc. At the bottom portion of this portion of the ticket is a conspicuous mark 6 to indicate whether the ticket is used for a full fare or a half fare, and below this is a legend 7 to indicate whether the ticket is redeemable for excess fare or not; at the extreme end of the ticket is printed in bold type a figure, 8, here shown as a 5, or it may be a multiple of five, indicating the primary amount or value of the ticket, and on the margin 9, alongside of the last three conspicuous items, are printed the numerals 9, 8, 7, 6, to indicate fractions of the primary figure up to the next higher figure; and these numerals are printed in reverse order so as to register with like numerals in consecutive order printed on the coupon. In the space in which the primary value is printed, may also appear words indicating the direction of travel of the passenger, as, for example, "North" and "South".

The coupon 10, has a space 11 for the railroad's name; a plain designation that the coupon is the passenger's receipt for his fare; a warning to note that it correctly shows the fare paid, and the primary figure 12 corresponding to that on the conductor's portion of the ticket first described, but this figure is in much larger and bolder type, and in distinctive color, here shown as red, so as to compel attention. Below this figure is a company legend, at 13. Printed on this coupon in line with like matter on the conductor's portion of the ticket, but in reverse order, are the matters relating to the redeemability of the ticket, 14, and whether the fare is a full or a half fare, 15, and the fraction numerals 16. This coupon is divided from the conductor's portion by a crease 17 or other means by which it may be readily folded back to back upon said portion, as shown in Fig. 2 and indicated in Fig. 3, and after being punched be readily severed from such portion. As indicated by the dotted lines in Fig. 2, the like matters on the two portions of the ticket register with sufficient accuracy to insure like punching of the two.

Upon collection of a cash fare, the conductor is required to furnish the passenger with a ticket in which he indicates by punching the exact amount of the fare paid, whether a full or a half fare, and whether the coupon is redeemable. For a fare of less than ten cents, the conductor must punch out the name of the station at which the passenger boards the train and the name of the station of destination. If the fare be nine cents, the 9 in the margin of the five-cent ticket will also be punched out. A five-cent ticket cannot, therefore, be used for a ten-cent fare, and hence the conductor must use the ten-cent ticket for that fare, or any fare up to and including fourteen cents; and so on through the series for various fares from fifteen to nineteen cents; from twenty to twenty-four cents, etc.

The series of tickets comprises one for the minimum primary number, and one for each of the multiples of that number, up to the limit, which may be, for example, one dollar, if the minimum be five cents; and on each ticket the primary figure is displayed conspicuously and accompanied by the cent numerals to carry it up to the next higher primary figure. Thus the accounting officer knowing the fare between stations punched, has a check on the conductor that compels him to use a ticket with the correct primary figure, and makes him accountable for any error in the fraction numerals. The primary figure, of course, will be the minimum fare between any two stations, and this usually is five cents.

Variations in details to suit the requirements of different roads or other users of the invention, are permissible within the scope and purpose of the invention.

What I claim is:—

1. A cash fare ticket, composed of a conductor's stub and a passenger's coupon, each having a primary fare expression in bold type, and adapted to be folded back to back and similarly punched at one operation, the said stub and coupon bearing in alining relation like valuation marks so located as to be superposed when the stub is folded over upon the coupon whereby the exact fare paid may be simultaneously indicated on both.

2. A cash fare ticket, composed of a conductor's portion containing names of stations in sequence, a fixed fare designation based upon a fixed minimum charge and which may be such minimum charge or any multiple thereof, and numerals indicating fractions of such charge, and a passenger's coupon upon which the stated valuation items of the conductor's portion are repeated but in reverse order.

3. A cash fare ticket, composed of a conductor's portion containing names of stations in sequence, a fixed fare designation based upon a fixed minimum charge and which may be such minimum charge or any multiple thereof, and numerals indicating fractions of said charge, and a passenger's coupon upon which the stated valuation items of the conductor's portion are repeated but in reverse order, the fixed charge being indicated upon the coupon in extra large type so as to compel attention.

4. A cash fare ticket, composed of a conductor's portion containing names of stations in sequence, a fixed fare designation based upon a fixed minimum charge and which may be such minimum charge or any multiple thereof, and numerals indicating fractions of said charge, and a passenger's coupon upon which the stated valuation items of the conductor's portion are repeated but in reverse order, the fixed charge being indicated upon the coupon in extra large type of distinctive color so as to compel attention.

5. A cash fare ticket, composed of a conductor's portion containing names of stations in sequence, a fixed fare designation based upon a fixed minimum charge and which may be such minimum charge or any multiple thereof, numerals indicating fractions of said charge, and marks by which the ticket may be used for a full fare or a half fare, and a passenger's coupon upon which the amount and character of the fare are repeated in reverse order, and adapted to be folded back to back upon the conductor's portion, the fractional numerals and the marks indicating full fare and half fare on the conductor's portion and the passenger's coupon being so located that when the ticket is folded as described they will be superposed and simultaneously punched to show these values, and then detached.

6. A series of cash fare tickets, each of which tickets comprises a conductor's and a passenger's portion readily detachable, on each of which the exact amount of fare paid is noted by means of primary figures expressing the minimum fare or multiples thereof, and intermediate fractions between such primary fares, each ticket expressing a different fixed primary amount ranging from the minimum fare to any multiple thereof and also the fractions intervening between the fixed primary amount and that next higher.

7. A series of cash fare tickets, each of which tickets comprises a conductor's and a passenger's portion readily detachable, on each of which the exact amount of fare paid is noted by means of primary figures expressing the minimum fare or multiples thereof, and intermediate fractions between such primary fares, each ticket expressing a different fixed primary amount ranging from the minimum fare to any multiple thereof and also the fractions intervening between the fixed primary amount and that next higher, and the conductor's portion also containing the names of the stations on the road on which used.

8. A series of cash fare tickets, each of which tickets comprises a conductor's and a passenger's portion readily detachable, on each of which the exact amount of fare paid is noted by means of primary figures expressing the minimum fare or multiples thereof, and intermediate fractions between such primary fares, each ticket expressing a different fixed primary amount ranging from the minimum fare to any multiple thereof and also the fractions intervening between the fixed primary amount and that next higher, and the conductor's portion also containing the names of the stations on the road on which used, no one of which tickets may be used for a fare less than its fixed charge or greater than its fixed charge plus the fractions intervening between its fixed charge and the next higher fixed charge.

In testimony whereof I have hereunto set my hand this 25th day of April A. D. 1913.

CLIFFORD S. NORTON.

Witnesses:
C. H. MATTOCKS,
W. M. PETRY.

---

Copies of this patent may be obtained for five cents each, by addressing the "Commissioner of Patents, Washington, D. C."